May 11, 1965 J. R. JOHNSON 3,182,590

PRINT ROLL ADJUSTING MEANS FOR PRINTING APPARATUS

Filed Nov. 23, 1962 11 Sheets-Sheet 1

INVENTOR.
JAMES REID JOHNSON

BY John W. Hoag
ATTORNEY

PRINT ROLL ADJUSTING MEANS FOR PRINTING APPARATUS

Filed Nov. 23, 1962 11 Sheets-Sheet 2

INVENTOR.
JAMES REID JOHNSON

John W. Hoag
ATTORNEY

PRINT ROLL ADJUSTING MEANS FOR PRINTING APPARATUS

Filed Nov. 23, 1962 11 Sheets-Sheet 3

INVENTOR
JAMES REID JOHNSON
BY John W. Hoag
ATTORNEY

May 11, 1965 J. R. JOHNSON 3,182,590

PRINT ROLL ADJUSTING MEANS FOR PRINTING APPARATUS

Filed Nov. 23, 1962 11 Sheets-Sheet 4

INVENTOR.
JAMES REID JOHNSON

BY John W. Hoag
ATTORNEY

INVENTOR
JAMES REID JOHNSON

John W. Hoag
ATTORNEY

INVENTOR.
JAMES REID JOHNSON
BY
John W. Hoag
ATTORNEY

May 11, 1965 J. R. JOHNSON 3,182,590

PRINT ROLL ADJUSTING MEANS FOR PRINTING APPARATUS

Filed Nov. 23, 1962 11 Sheets-Sheet 7

INVENTOR.
JAMES REID JOHNSON

BY John W. Hoag
ATTORNEY

May 11, 1965 J. R. JOHNSON 3,182,590

PRINT ROLL ADJUSTING MEANS FOR PRINTING APPARATUS

Filed Nov. 23, 1962 11 Sheets-Sheet 8

INVENTOR
JAMES REID JOHNSON

John W. Hoag
ATTORNEY

May 11, 1965 J. R. JOHNSON 3,182,590

PRINT ROLL ADJUSTING MEANS FOR PRINTING APPARATUS

Filed Nov. 23, 1962 11 Sheets-Sheet 9

INVENTOR.
JAMES REID JOHNSON

John W. Hoag
ATTORNEY

May 11, 1965 J. R. JOHNSON 3,182,590

PRINT ROLL ADJUSTING MEANS FOR PRINTING APPARATUS

Filed Nov. 23, 1962

11 Sheets-Sheet 10

INVENTOR.
JAMES REID JOHNSON

BY

John W. Hoag
ATTORNEY

PRINT ROLL ADJUSTING MEANS FOR PRINTING APPARATUS

Filed Nov. 23, 1962

INVENTOR.
JAMES REID JOHNSON
BY
John W. Hoag
ATTORNEY

United States Patent Office 3,182,590
Patented May 11, 1965

3,182,590
PRINT ROLL ADJUSTING MEANS FOR PRINTING APPARATUS

James Reid Johnson, Stonington, Conn., assignor to Johnson Operating Corporation, New York, N.Y., a corporation of Connecticut Filed Nov. 23, 1962, Ser. No. 239,678
14 Claims. (Cl. 101—248)

This invention relates to means for driving print rolls and adusting the position of print rolls in apparatus in which a plurality, usually a number of print rolls, each print part of a composite pattern on a travelling length of material. It is directed to means which are improvements upon the means disclosed in my U.S. Patent No. 2,893,310 of July 7, 1959.

An object of the invention is to provide improved means for driving the print rolls and for adjusting the position of the print rolls to bring a plurality or a number of print rolls into "fit" for successively printing parts of a desired pattern within the same area and so that the part of the pattern printed by one roll will be properly located with respect to the part of the pattern printed by another roll.

Another object of the invention is to provide improved means for adjusting and controlling the position of print rolls in a horizontal plane so that the parts of a pattern printed by a plurality of rolls will be aligned laterally.

Another object of the invention is to provide improved means for adjusting and controlling the position and level of print rolls so that the axes of a plurality of print rolls will be parallel and the upper and lower edges of parts of a pattern printed by a plurality of rolls will be parallel.

Another object of the invention is to provide improved apparatus of the kind described which is simple and practical, and flexible in operation.

The invention will best be understood if the following description is read in connection with the accompanying drawings in which.

Figures 3, 18:
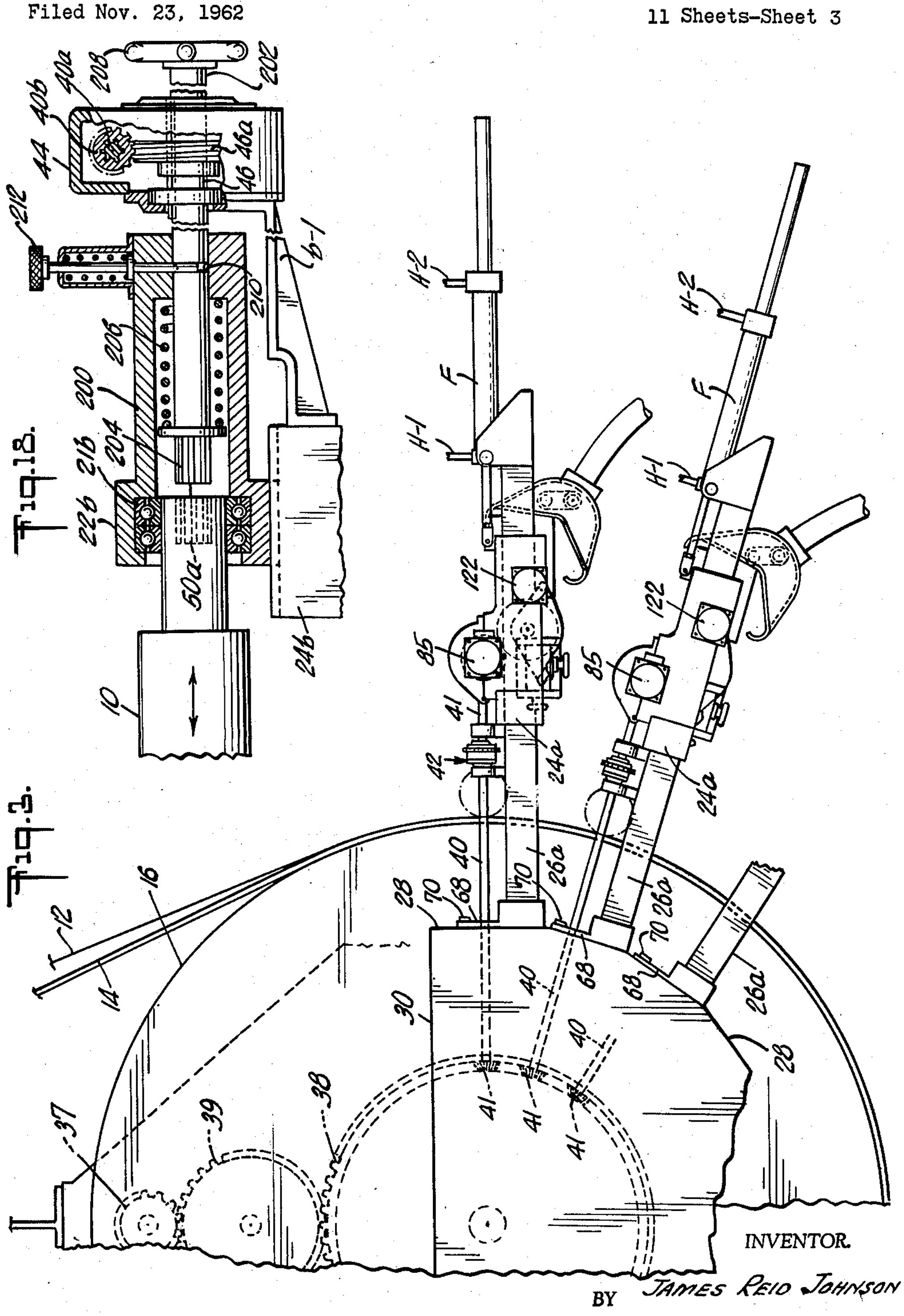
FIG. 3 is an end elevation from the viewer's left in FIGS. 1 and 2, with the drive means on the viewer's right.
Figures 13, 13A, 14:
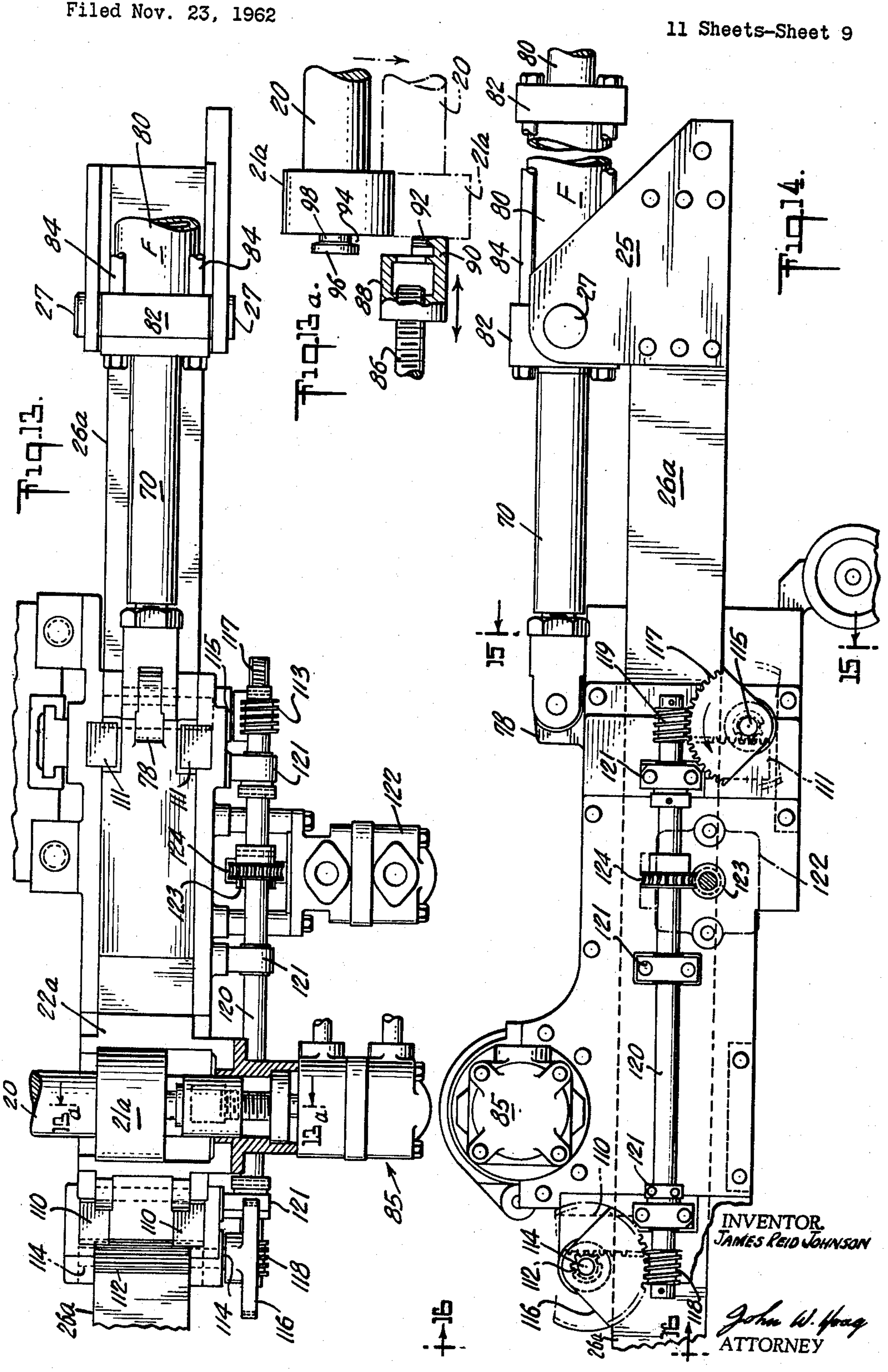
FIG. 13 is a plan view of means for adjusting horizontally and vertically the slides on which the print rolls and their associated color boxes and doctor blades are supported.
Figures 15, 15A, 16:
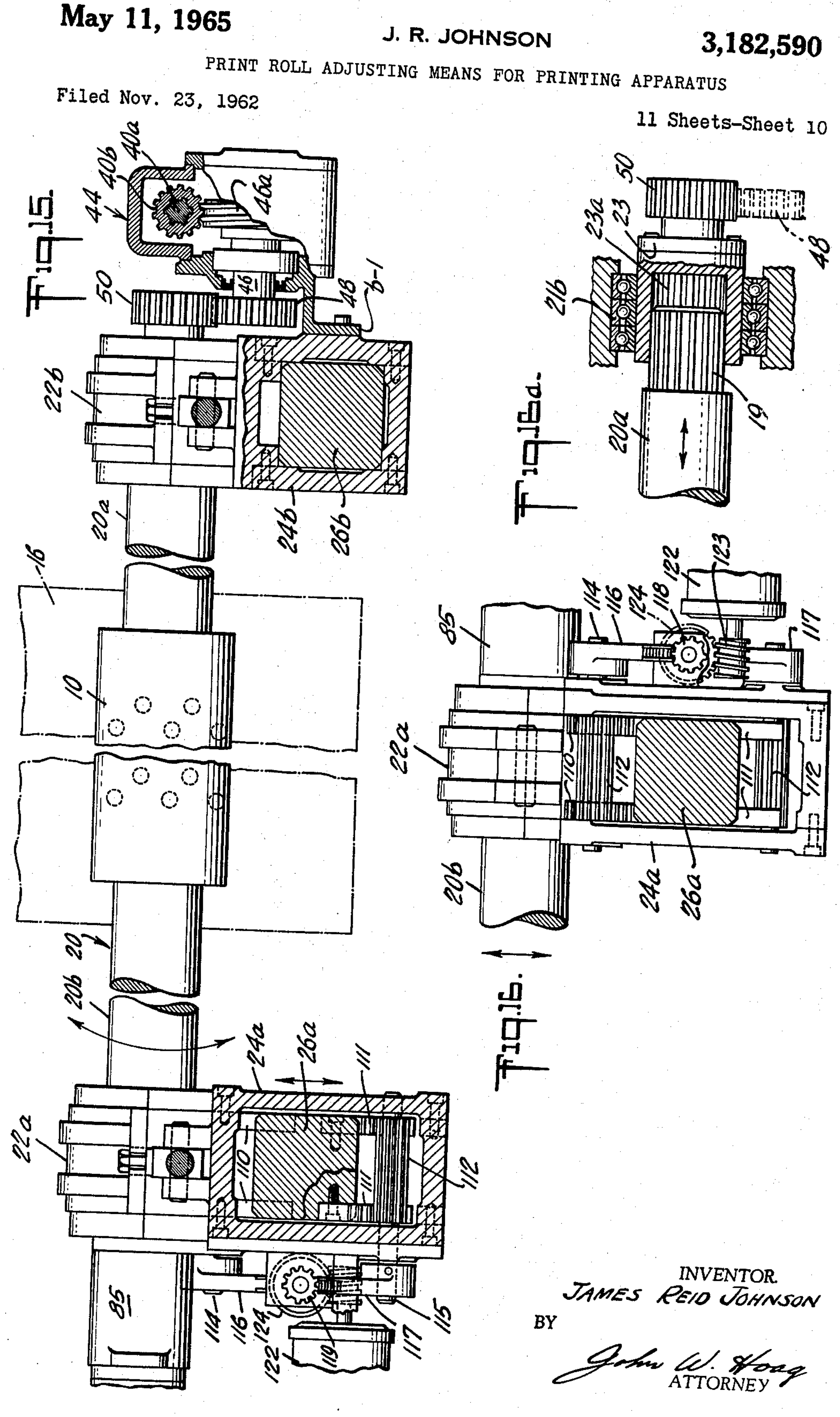
Figure 17:
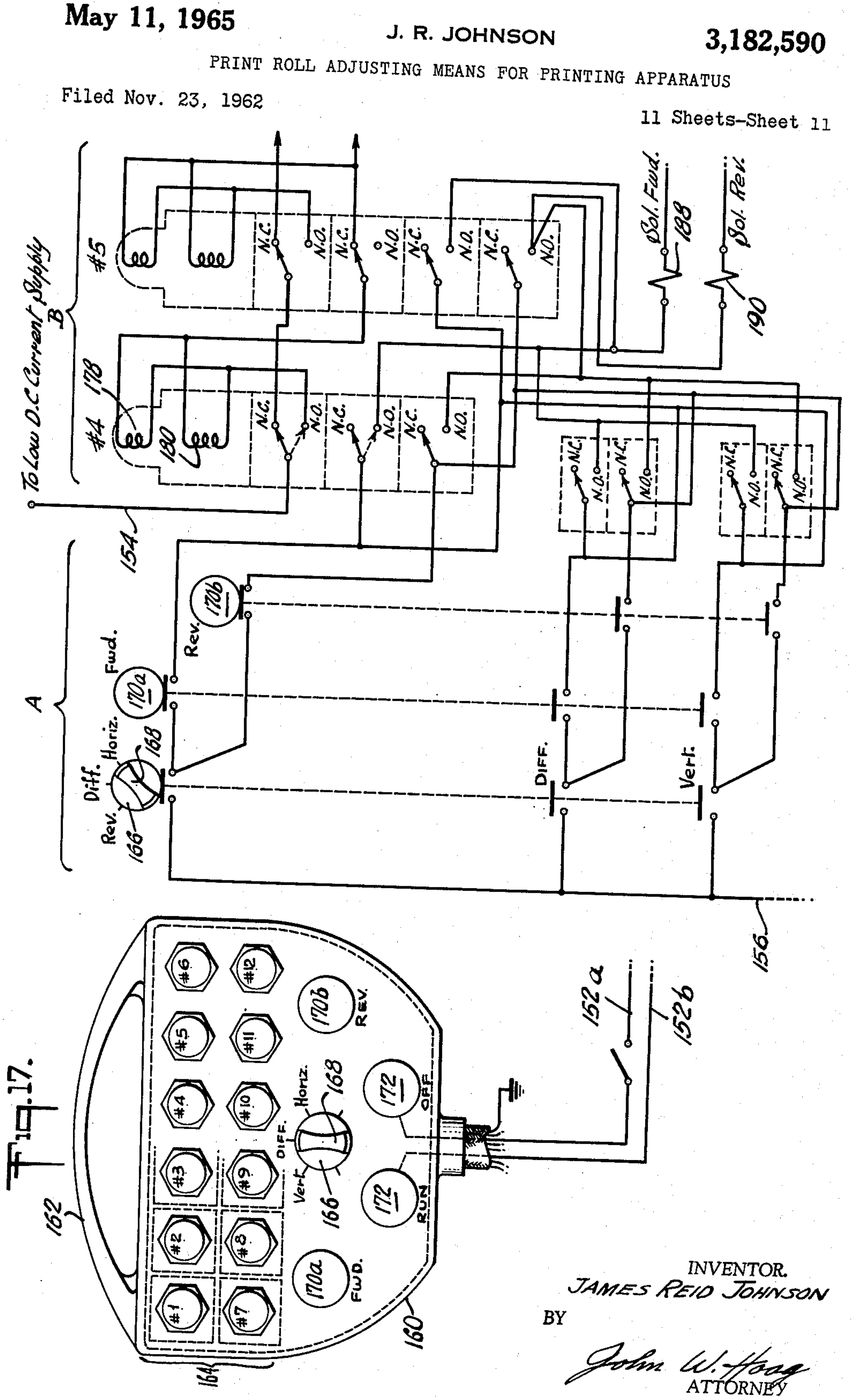

FIG. 13*a* is a view, partly in cross-section, taken on line **13*a*—13*a*** of FIG. 13;

FIG. 14 is a side elevation of the structure shown in FIG. 13;

FIG. 15 is a front elevation, partly in cross-section, taken on the line 15—15 of FIG. 15;

FIG. 16 is a rear elevation of a slide on its supporting nip (in cross-section), taken on the line 16—16 of FIG. 14;

FIG. 16*a* is a view, mostly in cross-section, showing means by which the lateral adjustment of a print roll mandrel is accomplished;

FIG. 17 is a diagrammatic view of control circuitry for the several power means employed; and FIG. 18 is a vertical section of a modification of the support means for one end of a mandrel as shown in FIGS. 15, 16 and 16*a*.

In the embodiment of the invention illustrated herein a set or combination of print rolls, usually a number of rolls, carry on their surfaces respectively different parts of a pattern to be printed successively within the same area of a length of cloth 12 (FIG. 3). The print rolls together with an interposed "blanket" 14 and rotated against rotatable backing means 16 and the length of cloth 12 and blanket 14 are lead between the print rolls and the backing means and advanced due to the rotation of the print rolls. Since the length of cloth is moving, the first roll will print its part of a composite pattern within a first area of the cloth and will be printing its part of the pattern on a second and adjoining area of the cloth while the second roll is printing within the first area; and will be printing within a third area while the third roll is printing within the first area and the second roll is printing within the second area, etc.

It is, of course, essential that the different parts of the pattern be printed in proper position with respect to one another and the pattern as a whole. For accomplishing this, the print rolls have to be in "fit" or register rotatively, so that each roll will begin printing along the line on its surface where its portion of the pattern begins which is indicated by a pitch mark conventionally supplied by the engraver who engraves the roll with its pattern, as well as being in register horizontally and laterally, i.e., with all the rolls exactly parallel and with their ends aligned in a plane normal to the axes of the rolls.

Figure 2:
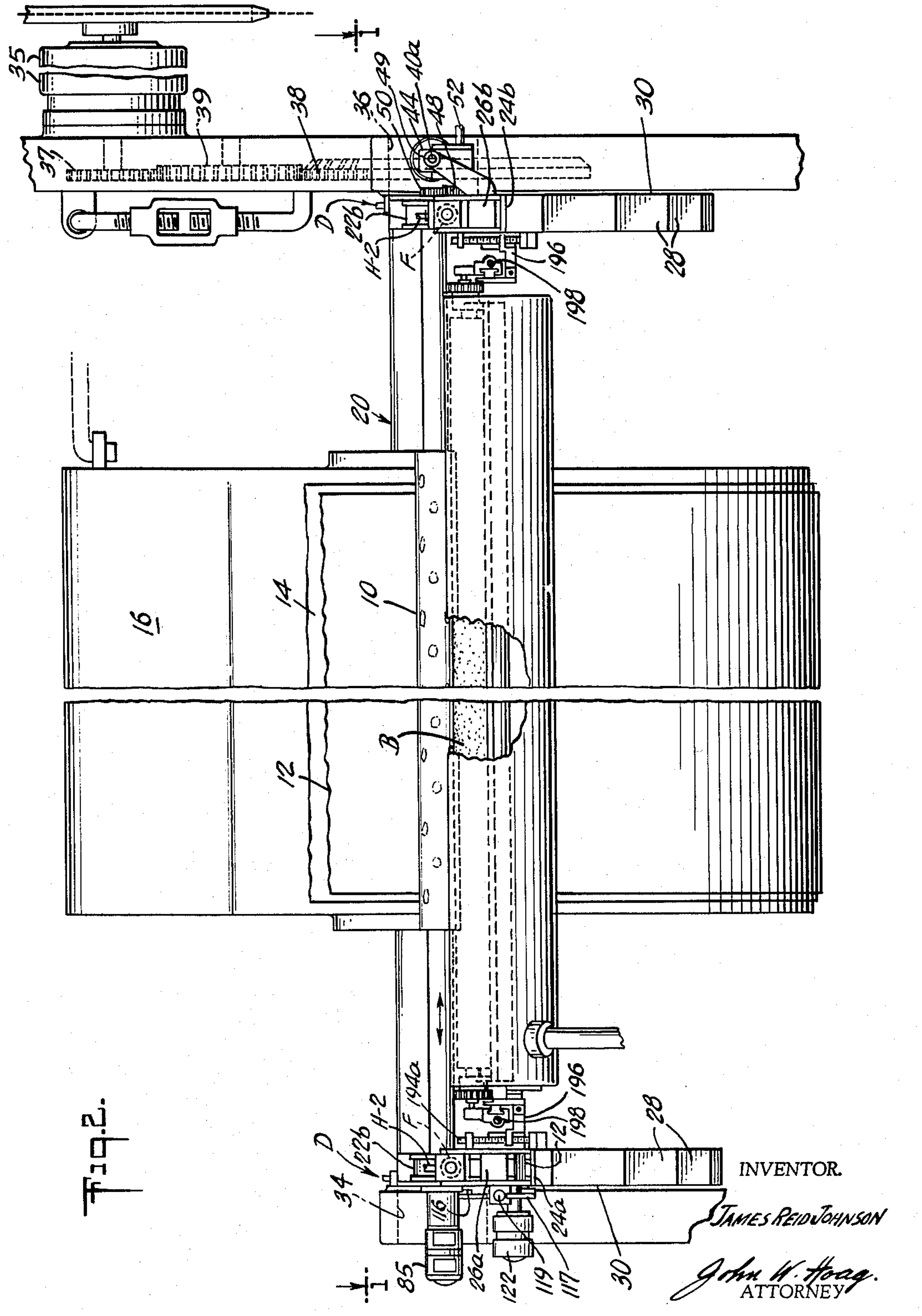
FIG. 2 is a front elevation of the embodiment shown in FIG. 1.

The print rolls are tubular or annular and have keyways 18 on their inner peripheries respectively and are mounted by first being slid endwise onto splined mandrels 20 respectively, which extend axially of the rolls and project well beyond their ends. Each roll and mandrel is lowered onto parallel pairs of slides **24*a* and 24*b* supported on spaced, parallel pairs of "nips" 26*a* and 26*b* which project from horizontally aligned "flats" 28 provided around the periphery of spaced support means 30, 32 respectively, between which the backing cylinder 16 is rotatably suspended on trunions 34, 36 as best shown in FIG. 2. Different sets of print rolls, for printing different designs, may vary in diameter but they have central openings of standard size and thus one set of mandrels may be used with different sets of print rolls. The mandrels are slightly tapered and the narrower ends are inserted in the center openings of the print rolls. Ball bearing means 21*a* are fixed on the larger end (FIG. 13) of each mandrel and the narrower end 22*a*** (FIG. 16*a*) is reduced in diameter and provided with teeth 19 which engage with, and are slidingly related to, teeth **23*a* provided on the inner surface of a cap member 23, around which the ball bearing means 21*b* is supported, and on the outer end of which is fixed a gear 50, disposed in axial alignment with the main body of the mandrel and referred to herein as the mandrel gear. The bearings 21***a* and 21*b* are spaced apart to register with, and be received within, the two-part bearing housings 22*a* and 22*b* provided on said slides 24*a* and 24*b* respectively, and gear 50 is positioned to register with a gear 48 on the inner end of the gear train by which the print roll is rotated.

Each ball bearing 21*a* is narrower than its housing 22 and can move within its housing about two inches axially of the mandrel, and the reduced end 20*a* of each mandrel can move axially the same distance within its cap member 23. Accordingly, each mandrel 20 and the print roll it supports may be adjusted axially of the mandrel through a distance of approximately two inches. In practice only very slight movements of a print roll axially are required for adjustment, usually on the order of one inch or less. Such movement is actuated by power means, preferably by a hydraulic motor 85 as shown in FIG. 13, individual to each print roll and controlled by the means shown in FIG. 17 which will be described. The outer end of the piston rod 86 of each hydraulic motor 85 is positioned in alignment with a mandrel 20, and its outer end and the opposed end of the mandrel are interengaged so that as the piston rod is moved axially it will move the mandrel axially and therefore also the print roll which is on the mandrel. In FIG. 13*a* the outer end of piston rod 86 is shown screw-threaded and engaged with a box-like intermediate member 88 which has a forwardly extending, substantially semi-circular projection 90 terminating in an upwardly extending flange 92 adapted to extend into the space 94 between the head 96 at the end of the mandrel and around the reduced end portion 98 of the mandrel, between the head 96 and the bearing 21*a* carried by the mandrel end.

As shown, the nips are square or rectangular in cross-section, and the slides are preferably rectangular so that they extend around all four sides of the nips (FIGS. 15 and 16). Means are provided so that one slide, 24*a*, of each pair of slides may be raised and lowered relative to its supporting nip to control the level of the print rolls and the several elements which are supported between the opposed sides of each pair of slides.

Figure 1:
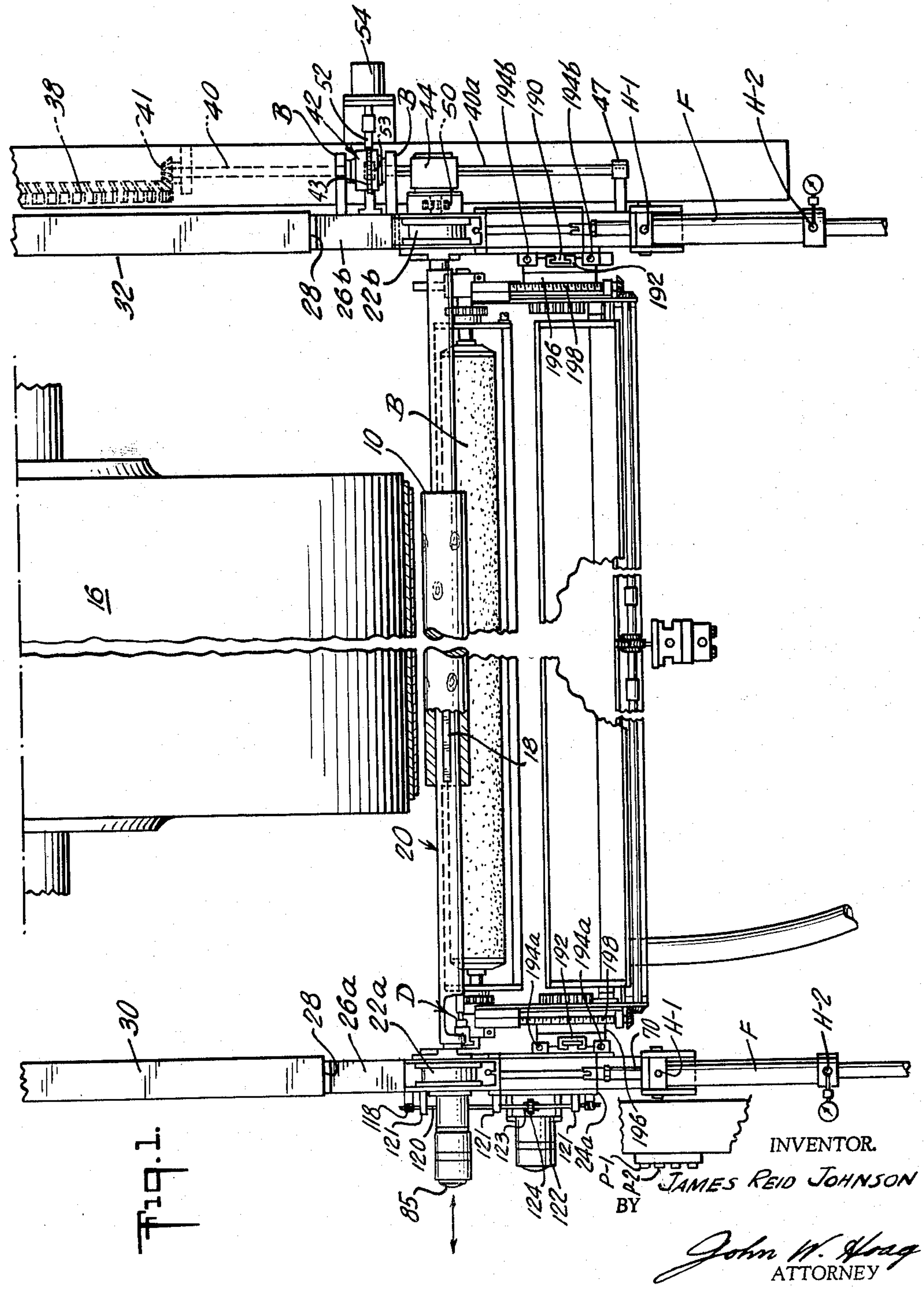
FIG. 1 is a top plan view of an embodiment of the invention.

The pairs of slides are actuated to move toward and away from the backing means 16 by fluid cylinder means F (FIG. 14), located on each slide support or nip, adjacent its outer end. The fluid cylinder means shown are actuated by a fluid system of known kind, indicated by the flexible hoses H–1 and H–2 and including valves (not shown) operated by push button control switches *p*–1 and *p*–2 on the outer side of slide 24*a* of each pair of slides (FIGS. 1 and 3).

Figures 8, 9:
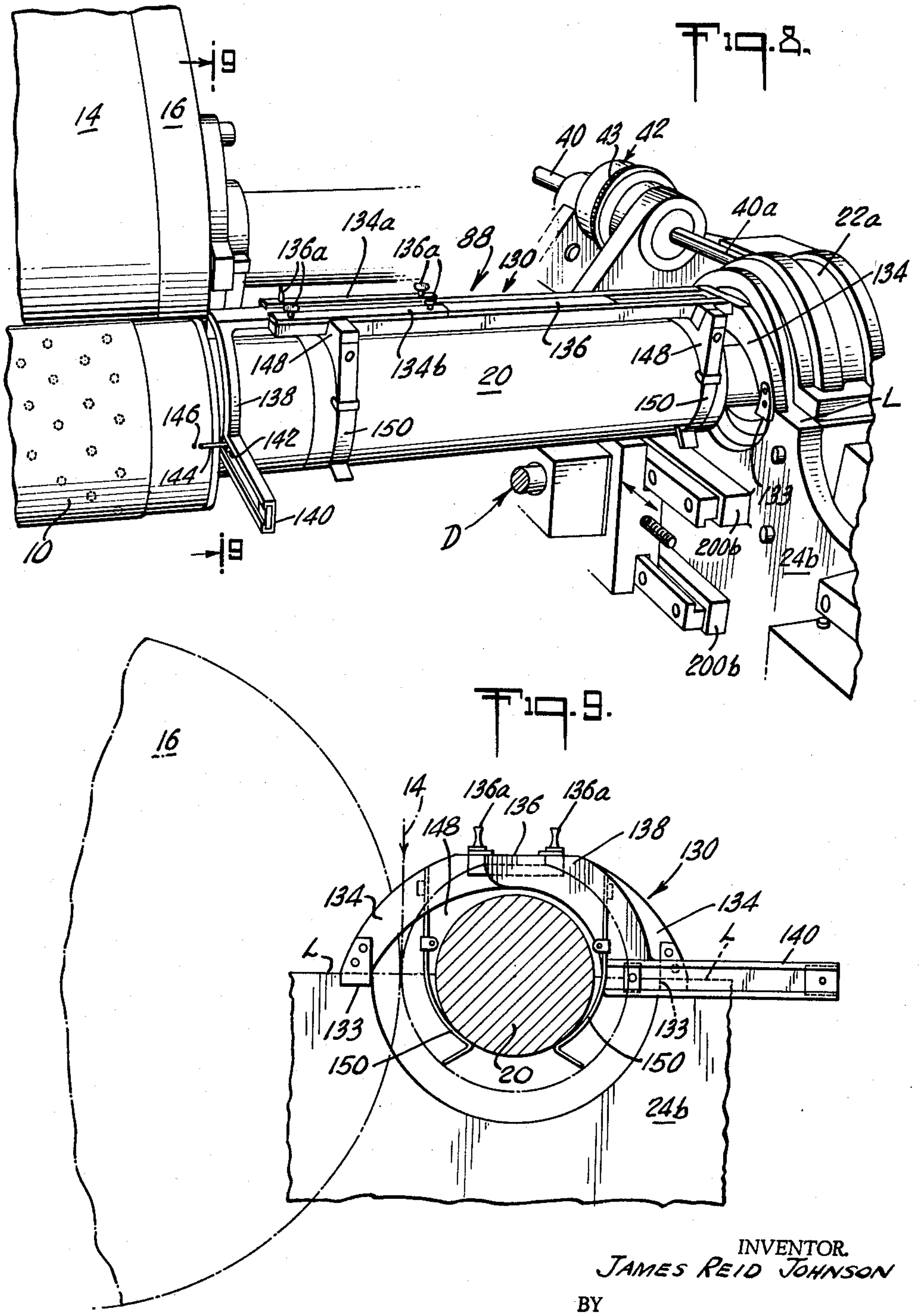
FIG. 8 is a perspective view showing one end of the backing roll and one end of a print roll and the inside flange of a slide templet means mounted on an end of a mandrel of one of the print rolls for facilitating rotary adjustment of the print roll.
FIG. 9 is a cross-section taken on the line 9—9 of FIG. 8.
Figures 10, 11:
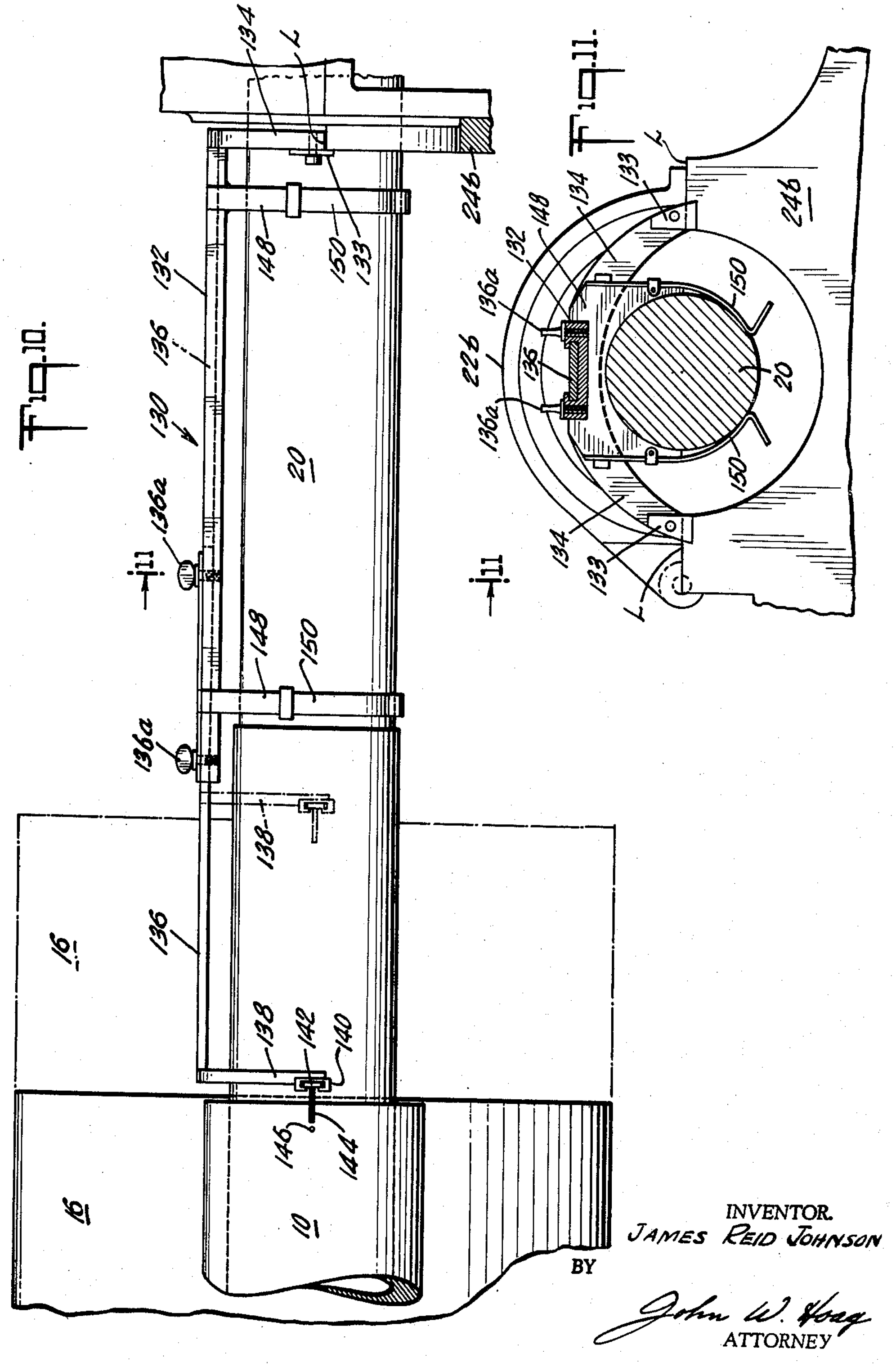
FIG. 10 is a side elevation on an enlarged scale of the mandrel end and temple shown in FIG. 8.
FIG. 11 is a cross-section taken on the line 11—11 of FIG. 10.
Figure 12:
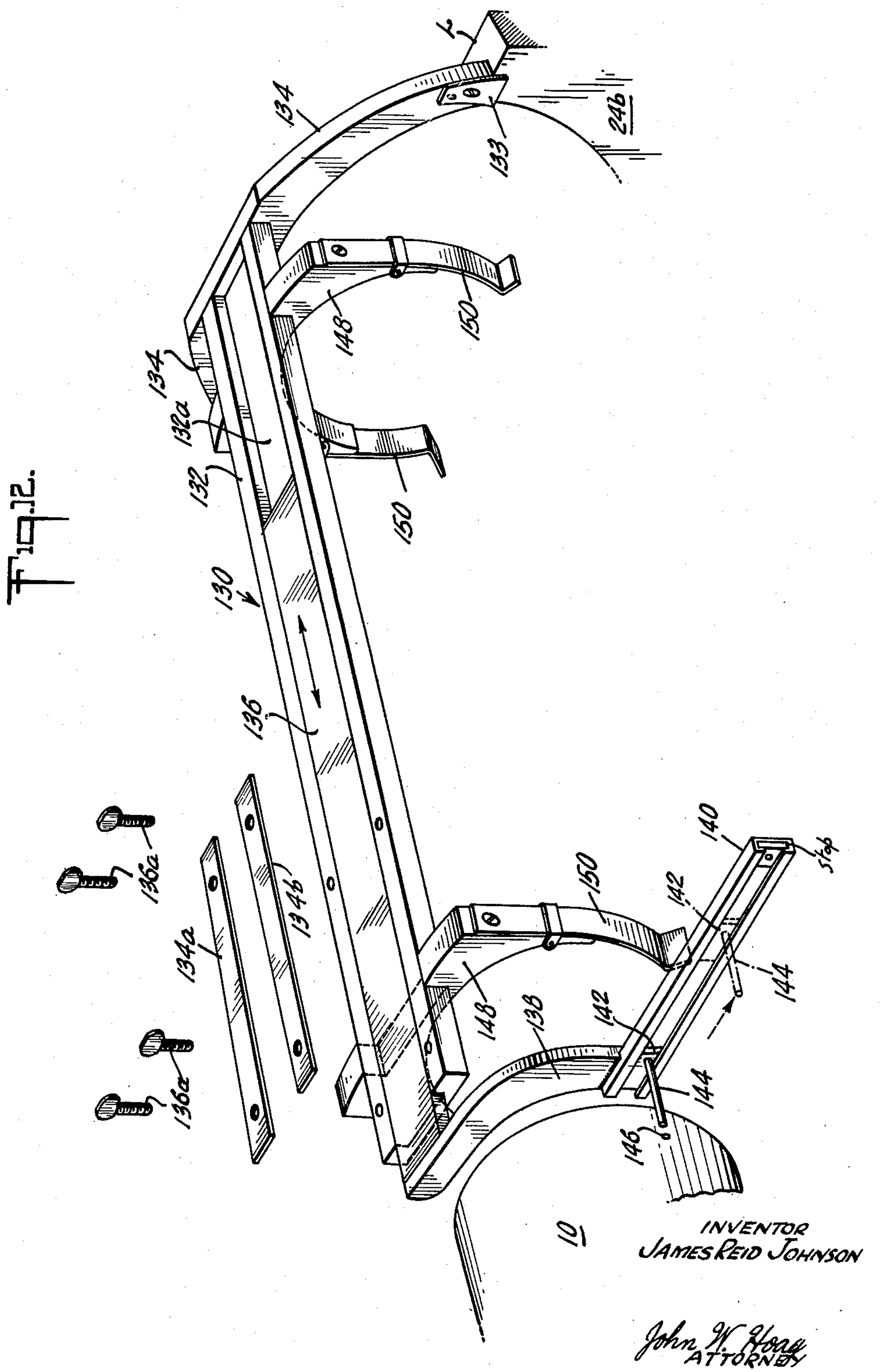
FIG. 12 is a perspective and partly exploded view of the templet means shown in FIGS. 8–11, on an enlarged scale.

Each pair of slides supports between them, in addition to a print roll 10, a color box C, a rotatable brush B by which color is transferred from the color box to the print roll, and a doctor blade D (FIGS. 1 and 8), by which color is removed from the non-printing areas of the print roll and returned into the color box. Each print roll, and its color box, brush and doctor blade, are movable together toward and away from the backing means. The doctor blade is adjustable toward and away from its print roll, both vertically and horizontally, as is described in my copending application S.N. 243,175, filed Nov. 23, 1962, now abandoned, and the color box and transfer brush are adjustable vertically and are also movable toward and away from the print roll, relative to their slide supports 24*a* and 24*b*, for adjusting their position relative to their print roll and to facilitate washing them, as is described in my copending application S.N. 239,546, filed Nov. 23, 1962 which also describes how each color box is progressively overturned as it is moved away from its print roll, and engages an excess color and wash water receptacle R, and is superimposed over it in upside down position, thus not only draining into it but also providing a cover over the receptacle and coacting with it to form a closure while the color box and brush are cleaned and the color supply conduit is cleaned.

Figures 4, 5:
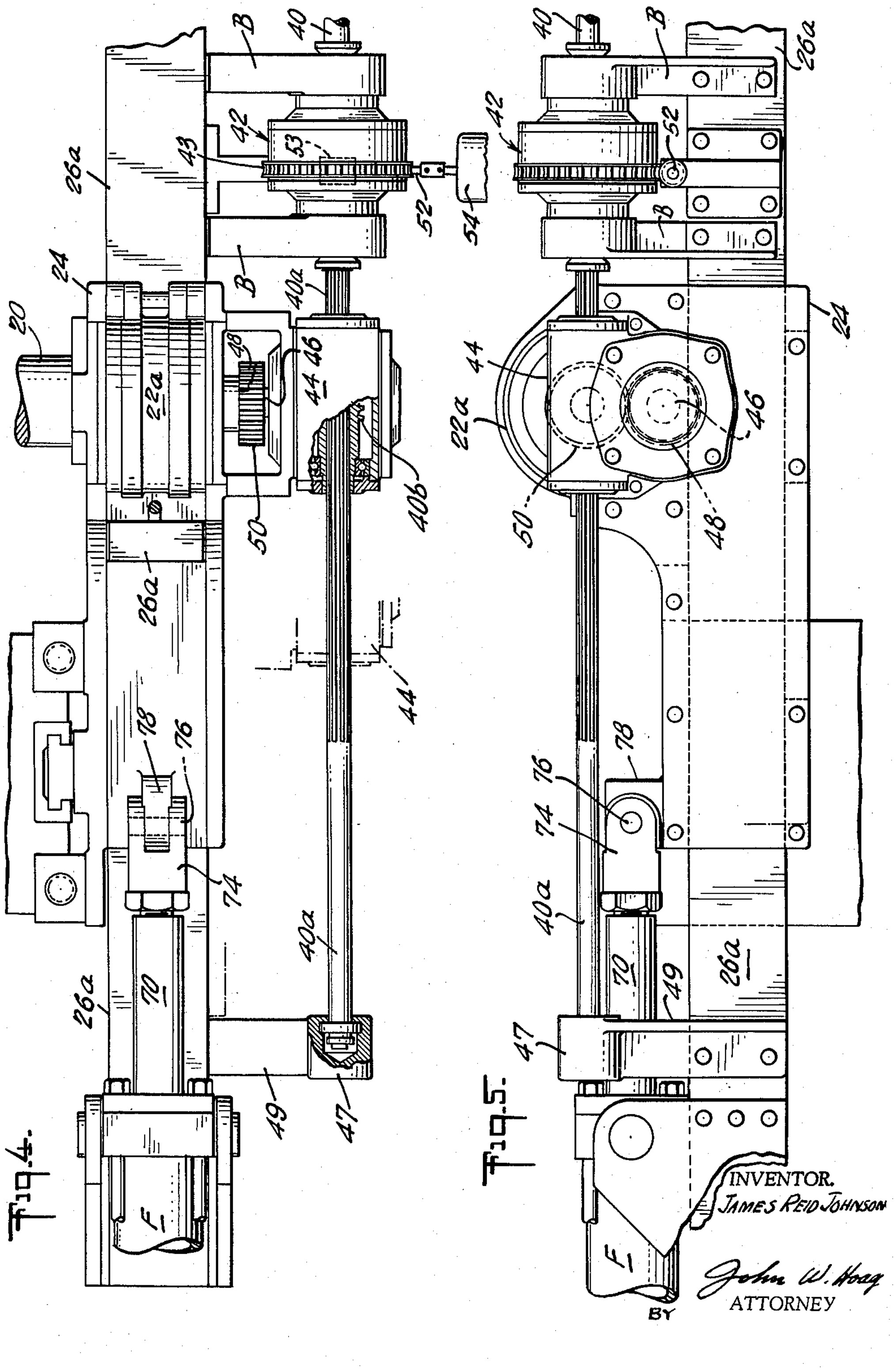
FIG. 4 is a top plan view of a portion of the assembly shown in FIGS. 1–3.
FIG. 5 is a side elevation of the structure shown in FIG. 4.
Figures 6, 7:
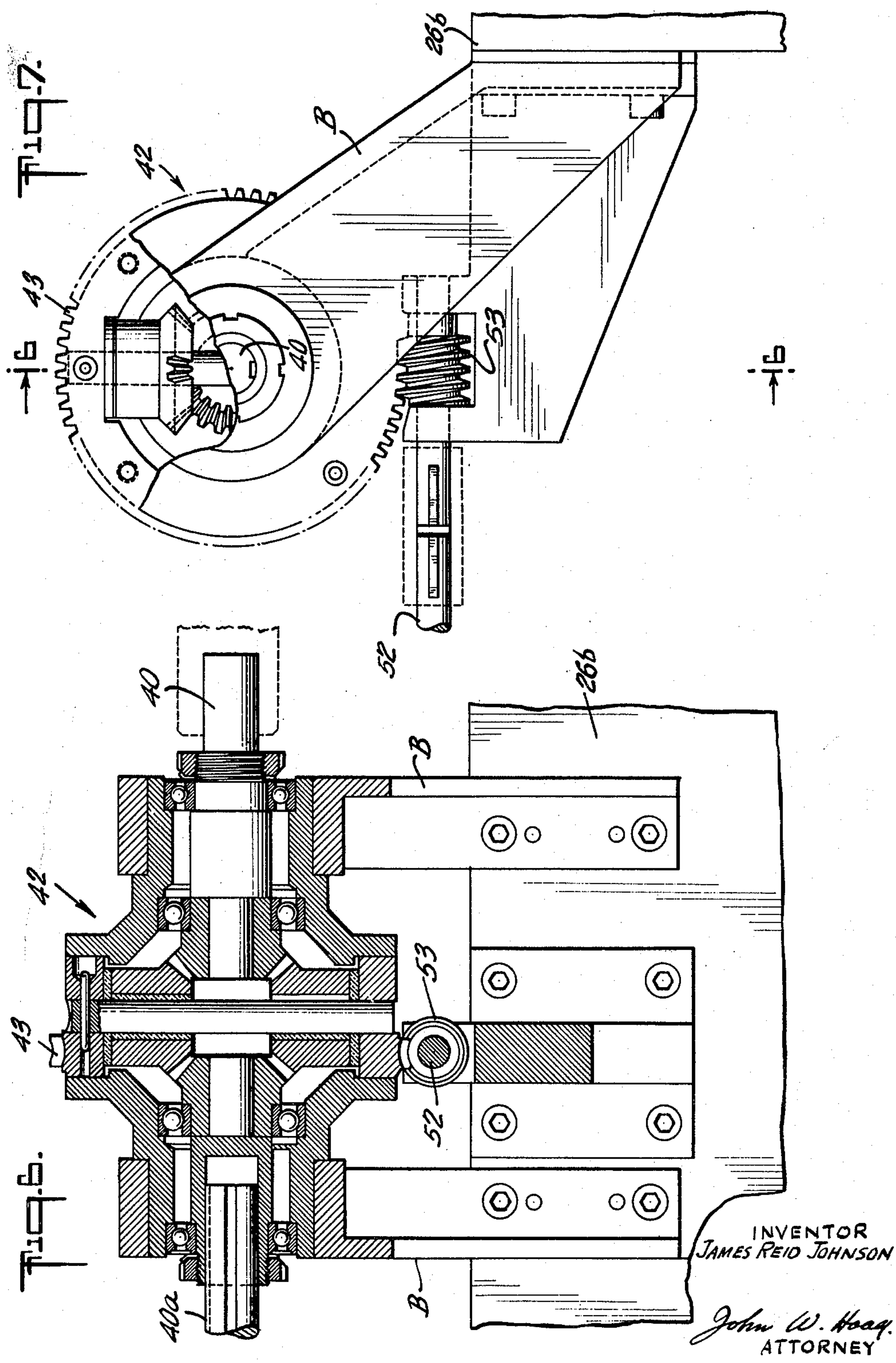
FIG. 6 is a view mostly in cross-section through the differential gear mechanism, taken in the line 6—6 of FIG. 7.
FIG. 7 is an end elevation of the structure shown in FIG. 6.

The drive for each print roll is from a common or bull gear 38 (FIG. 2) through gears and drive shafts individual to each roll. The bull gear is driven by hydraulic means including motor 35 (FIG. 2) through gear reduction means including gear 37 and idler gear 39. A drive shaft 40 for each print roll (FIG. 3) has at one end a bevel gear 41 which is driven from bull gear 39, and at its other end leads to a differential 42, which, as shown in FIGS. 4, 5 and 7 may be supported by bracket *b*, projecting from the side of the related nip 26. A splined shaft 40*a* leads from the differential 42 through a gear box 44 to a bearing 47 provided in a bracket 49 which extends from the outer side of the nip 26*a* which supports the end of the print roll mandrel 20 which carries the cap 23 with the bearing means 21*b*, and mandrel gear 50 (FIGS. 15 and 16*a*). Within gear box 44 a worm wheel 46*a* on shaft 6 is engaged by worm 40*b* on shaft 40*a*. Shaft 46 extends at right angles to shafts 40 and 40*a*, and carries a gear 48 which is positioned to mesh with the mandrel gear 50 when the print roll and the mandrel on which it is mounted, together with the mandrel end cap 23, are lowered into the bearing housings 22 on slides 24*a* and 24*b* which receive the bearings 21*a* and 21*b* respectively. Each gear box 44 is slidable on splined shaft 40*a* for movement with its associated print roll and the pair of slides 24*a* and 24*b*. One of the gears 43 of each differential 42 is connected with worm 53 on shaft 52 of an hydraulic motor 54, actuated by control means shown in FIG. 17, and the rotation of the said shaft and gear by motor 54 can be used to rotate the print roll into position to register rotatively with the other rolls. This adjustment can be made either when bull gear 38 is not rotating, or to modify the rotation imparted to the particular print roll by the main drive means 38 and thus change and adjust the rotary position of a print roll relative to the other print rolls.

Referring now to FIGS. 1–4 and 13, 14, it will be seen that each nip or slide support 26 is square or rectangular in cross-section and supports a slide or saddle 24*a* or 24*b* which extends over the top of the nip and down on either side of the nip, and may extend entirely around the nip, as shown in FIG. 5, and in FIGS. 13–16, in which case the distance between the upper and lower ends of slide 24*a* of each pair of slides should be sufficiently greater than the height of the nip to permit the slide to be raised, and moved up and down relative to the nip, to adjust the level one of one pair of slides, and therefore of the means carried by the slides. Each slide support or nip is fastened to a flat 28 of the support means 30 or 32 as by bolts 70 extending through the flange 68 at the inner end of the nip or slide support.

Each of the fluid cylinders F, which, as stated above, are on the nips respectively adjacent their outer ends, comprises the piston rod 70 which extends toward the backing cylinder 16 and has at its outer end a threaded portion onto which is screwed the adjacent end of the clevis 74, which is pivotally attached to the adjacent end of the slide, as by cross pin 76 which extends through a lug 78 extending up from the slide. The pistons for the slides of each pair of slides are activated in unison, toward and away from the backing cylinder, by hydraulic fluid in a system of known kind, the valves of which are, as stated above, controlled by electric circuit means including push button switches *p*–1 and *p*–2 (FIG. 1). The hydraulic cylinder means F illustrated in FIG. 14, each comprises a tubular body portion 80 closed at the ends by members 82 which are held tightly against the ends of the body portion 80 by the tie rods 84 interconnecting the end members 82.

Flanges 25 extend up from the sides of each nip adjacent its outer end, and each cylinder F adjacent its inner end, is pivotally mounted on the nip between these flanges by cross pivot pins 27 extending from the flanges into recesses provided in the outer surface of the side walls of the ends members 82. The pivot mounting makes it possible for the cylinder to swing in a vertical plane to compensate for adjustments of the level of a print roll accomplished by adjustment of one slide of each pair—i.e., slide 24a—vertically relative to its supporting nip.

In order to adjust the level of a print roll, the slide 24a of each pair of slides 24a and 24b is raised or lowered on its supporting nip. The means for adjusting the elevation of the slide, and therefore also the bearing housing 22a (FIGS. 15, 16) which is disposed on that slide, comprises the pairs of racks 110 and 111 disposed vertically on the respective sides of a nip and extending either below or above the nip. The racks comprising each pair of racks are engaged simultaneously by an elongated pinion 112, or 113, disposed transversely of the nip and mounted on a shaft 114 or 115 which is carried by the slide and extends through the opposed side flanges of the slide, and carries a segmental gear 116 or 117 which meshes with the worm 118 or 119 on shaft 120, which is supported in brackets 121 on the outer flange of the slide and is driven from the hydraulic motor 122 through the worm 123 on the motor shaft which engages the worm gear 124 on shaft 120. Motor 122 is activated by control means included in the control circuit illustrated diagrammatically in FIG. 17.

For enabling the operator to initially position the print rolls in their support bearings so that they will be in fit with one another, and also for providing a simple and easy way for the operator to know when all of the rolls are aligned laterally, a templet 130 is employed which is placed between one end of a print roll and one of the slides between which the mandrel and the print roll thereon are rotatably supported. The upper edge of the inside flange of each slide 24a and 24b has a number of level positions L, disposed in alignment with the bearings in which the ends of the print roll mandrels are rotatably mounted. The level portions L are spaced apart by a curved portion of the upper edge of the inside flange of the slide. The position of the level portions L with respect to the bearings for the mandrel ends respectively, is the same in each instance and they coact with the gauge feet 134 of the templet means to position the templet means rotatively in exactly the same way for each print roll and its mandrel end.

As illustrated herein, the templet 130 comprises an elongated slideway 132 having at one end the foot 134, with the abutment flange 135, adapted to rest on any one of the level portions L on the upper edge of the inner slide or flange of a slide 24a or 24b and provide a gauge automatically positioning the templet assembly, and a slide 136 adjustable longitudinally within the slideway 132, and having, at its end adjacent the end of the print roll, a support arm 138 which curves downwardly and acts as a support for a small slideway 140 which is disposed radially with respect to the print roll. Within the small slideway 140 is a slide 142 supporting a pin 144 which is parallel with the axis of the print roll and in use serves as an indexing means coacting with a mark 146 conventionally supplied by the engraver which is a point or line of reference on the roll surface. When the mark 146 and the pin 144 are in alignment the print roll is in the proper rotative position to print its part of the composite pattern.

As shown herein the assembly of the slide 136 and slideway 132 is adapted to rest on an end portion of a mandrel of a print roll which is being placed into fit. Yoke members 148 are provided and supported by the slideway, and extend at right angles to it. The yoke members rest upon the mandrel end and are suitably curved for this purpose, and on opposite sides of each yoke member resilient strap members 150 are provided which extend beyond the yoke ends. The extended lower end portions of the strap members 150 are curved inwardly and constitute spring arms which lightly contact opposite sides of the mandrel and thus help to position and balance the templet on the roll. They may be readily sprung apart to permit the templet to be lifted from the mandrel.

The slideway 132 comprises the base portion 132a and the retainer plates 134a and 134b which are attached to the base portion along its lateral margins, as by screws 136, and extend inwardly from the top of the raised margins over the lower intermediate portion of 132a and over the lateral margins of a slide 136 disposed on said portion 132a.

It will be understood from the description that the templet 130 may be shortened or extended in length by moving slide 136 within slideway 132. In use the gauge foot carried by the slideway is positioned upon a level portion L of the upper edge of the inner depending side or flange of the supporting slide 24a or 24b, and slide 136 is pulled longitudinally out of the slideway 130 until the indexing pin 144 overlaps the end of the roll. When the rotary position of the print roll is positioned angularly such that the mark of reference 146 thereon is radially aligned with pin 144 the mark 146 will be in a plane passing through the center of the bearing means which support the mandrel end, and 180° removed from contact with the surface of a length of material disposed between the print roll and its backing means, and so will be in position to be seen. When the other print rolls are similarly positioned they will be in rotary "fit" and ready to print.

In FIG. 1 extensions 190 from the inner sides of the slides 24a and 24b provide support means in which the color box and brush are adjustable at right angles to the supporting slide or nip in slideways 192, on screws 194a, 194a and 194b, 194b. The extensions 190 also provide support means 196 in which are mounted the screw rods 198 on which color box and brush are adjustable in a plane parallel to the supporting slide and movable between the associated print roll 10 and receptacle R.

Extensions 200a, 200b from the inner sides of the slides 24a and 24b, comprising a pair of slides, provide support means in which the doctor blade is mounted and is adjustable toward and away from an associated print roll (FIG. 8), both in a plane parallel to the plane of the supporting sides and in a plane normal to the plane of the slides, as is described in my copending application S.N. 243,175, filed Nov. 23, 1962, now abandoned.

The control circuit shown diagrammatically in FIG. 17 illustrates a circuit for control of actuating any one of the print rolls, both forwardly and in reverse, and for adjusting its rotary angle relative to the other print rolls, its level, and its alignment axially, relative to other print rolls in the plane of its supporting bearings.

It will be understood from the drawings and the description above that in the particular embodiment of the invention illustrated and described herein, the means for adjusting each doctor blade toward and away from its associated print roll, both in a plane parallel to the plane of the supporting nip, and in a plane normal to the plane of the nip, are manual. The means illustrated for adjusting the color box vertically is also manual, and the means for moving a color box and brush combination between its associated print roll (operating position) and its associated receptacle (washing position) is an hydraulic system of known kind, with the valves of the hydraulic system actuated by solenoids in an electric circuit of known kind controlled by push button switch means which may be located in any convenient position.

The pairs of slides 24a and 24b which carry the print roll sub-assemblies, i.e., print roll, doctor blade, color box and brush, are moved on their pairs of supporting nips respectively by hydraulic means of known kind including cylinders F located on the pairs of nips, with their valves means actuated by solenoids in electric circuits of known kind controlled by push button switch means p–1 and p–2 located on the nips.

The means for adjusting each print roll to bring it into register with the other print rolls, rotatively; and, axially, so that the ends of the print rolls will be aligned, and as to its level, so that the axes of all the print rolls will be parallel, comprise a number of sets of push button controls 164, 166, and 170*a*, 170*b*, and a plurality of sources of power 154 and 156, and a plurality of interconnected electric circuits A and B (FIG. 17), which coact to first condition circuitry to open and close valves in an hydraulic system to transmit hydraulic energy only to effect one of the three kinds of movement of a particular print roll to accomplish an indicated one of the above stated three adjustments, and then to actuate the particular means by which the adjustment is accomplished. The conditioning circuits, corresponding in number to the number of print rolls, are selectively connected to the low D.C. current supply 154 by push button switches numbered 1–12, and when one of these switches is closed a lamp 178 in the selected circuit lights up and is held lighted by the associated solenoid 180. Power from a source indicated by cable 156 is transmitted through circuit A, to the selected B circuit in accordance with the setting of the three position dial switches 166, to accomplish the desired movement when the switch for forward movement 170*a*, or the switch for reverse movement 170*b*, is closed. The circuits A, and B, are independent of the source of energy indicated by leads 152*a* and 152*b* in FIG. 17, which is the main drive for the print rolls, identified as 35 in FIG. 2. Thus the three indicated kinds of adjustment can be made while the print rolls are otherwise stationary or while they are rotating.

FIG. 17 illustrates a portable control member 160, which may be substantially the size indicated, and may be readily carried by the operator, as by handle 162. The panel comprises four sets of control switches, the push button switches indicated generally by the numeral 164, and numbered 1–12, which are included respectively in conditioning circuits B, such as the circuits #4 and #5 shown at the right hand side of FIG. 17, and which provide individual control for twelve print rolls; the three-way switch 166, the rotatable member 168 of which may be turned to close a switch in circuit A to set the apparatus for any one of three adjustments of the print roll, indicated by the captions Vert. (vertical or level adjustment), Diff. (differential or rotative adjustment) and Horiz. (horizontal or axial adjustment); the pair of push button hold down switches 170*a* and 170*b*, captioned FWD and REV, which determine whether a print roll selected by closing one of the switches 164 will be moved in one direction or the opposite direction to accomplish the adjustment selected by the setting of member 168 or switch 166, and which complete a circuit from a power source indicated by cable 156 through circuitry A and the selected B circuit; and also the pair of switches 152*a* and 152*b*, captioned RUN and OFF respectively, for starting and stopping the main drive and which are, as stated above, connected to a main power source indicated as 35 in FIG. 2, through leads 152*a* and 152*b*. With the portable control member 160 in his hand, the operator can move freely around the machine and can stand in front of the machine and see the corrections he is making and can adjust the print rolls individually, rotationally, axially, and as to level, either while they are or are not connected to the main drive.

The push button switches indicated generally by the numeral 164 are connected to individual circuits equal in number to the number of print rolls employed, illustrated by circuits #4 and #5, each comprising a lamp 178, a solenoid 180 to control the lamp, and three pairs of contacts connected respectively to the low current supply 154, and the switches 182, 184, and 186 comprising the three-way switch member 166, and to the solenoids 188 and 190 which are responsive to switches 170*a* and 170*b* respectively to control valves in the hydraulic power system which determine the direction of the indicated movement. The contacts are labeled NC (normally connected) and NO (normally open). It will be noted that the "normally closed" contacts of the circuits controlled by push button switches 1–12, as illustrated by two of these circuits, #4 and #5, are connected in series to transfer energy from source 154 to the particular circuit selected by the closing of one of said push button switches, and that closing of the said switch closes the circuit through the contacts marked NO, conditioning that particular circuit only to transmit power from source 156 to the solenoid 188 or 190 associated with the switch 182 or 184 or 186, when the FWD or REV button 172*a* or 172*b* is held down, and for as long as it is held closed. As soon as one of the push button switches 164 (#1–12) is pressed the lamp 178 comprised in the circuit controlled by that swtich will be lighted indicating that circuit is conditioned to transmit power from source 156 for effecting the adjustment indicated by the setting of switch 166, and to move the adjusting means in the direction indicated when switch button 170*a* or 170*b* is closed, and for as long as said button 170*a* or 170*b* is held down by the operator.

In FIG. 18 is shown an alternate way of making a driving connection with a print roll mandrel which permits axial movement of the mandrel. In FIG. 18 a bearing 21*b* is fixed on the end 20*a* of the mandrel. The mandrel is not reduced in diameter. The bearing housing 22*b* in which the bearing 21*b* is received is extended in alignment with the mandrel by a tubular projection 200 supported by bracket 25*a* in alignment with the gear box 44*a* which, as shown in FIG. 15, has therein a worm wheel 46*a* driven by worm 50*b* on shaft 40*a*. Instead of the driven shaft 46, however, a driven shaft 202 is provided which extends through the gear box 44*a* and has at one end the gear 204 adapted to enter the adjacent end of the mandrel which is tubular and is provided on its inner surface with teeth thus providing on the inner surface of the mandrel a gear 50*a* which is equivalent to the mandrel gear 50 shown in FIG. 15. Around member 202 a spring 206 is provided urging gear 204 to move into the end of the mandrel and engage the gear 50*a*. A handle 208 is provided at the other end of member 202 to facilitate moving 202 axially to disengage gear 204 from gear 50*a*, as, for example, when it is desired to remove a print roll and its mandrel and bearings from the bearing housings. A cross groove 210 is provided in member 202 adapted to be engaged by the spring-pressed finger 212 when member 202 has been retracted to hold the gear 204 disengaged from gear 50*a*.

The construction shown in FIG. 18 has the advantage of strength. The teeth of gear 204 and 50*a* are subjected to less strain when a print roll is being pressed against a backing cylinder during a printing operation, than the teeth 19 and 23*a* of FIG. 16*a*.

There has thus been provided a structure in which the above mentioned objects are accomplished in a thoroughly practical manner.

What is claimed is:

1. A device for facilitating the rotative register of print rolls which are marked with a pitch mark and keyed on mandrels of apparatus for printing different portions of a composite pattern successively within the same area, said apparatus comprising support means defining a plurality of, bearing means in which the mandrel ends are rotatably supported, and related flat horizontal areas radially disposed at equal distance around a common center, a member adapted to be supported on a mandrel end, without interfering with the rotation of the mandrel, between one end of a print roll and the bearing in which the mandrel end is supported, said member having an indicator at one end, and a positioning foot adapted to rest on an outer surface portion of the bearing and to co-act with the said surface portion to determine the rotary position of the indicator and thus enable it to serve as a point of reference with which to align a pitch mark on a roll.

2. The device claimed in claim 1 in which the position of the indicator is adjustable both laterally and longitudinally relative to the print roll to compensate for differences both in length and diameter of different sets of print rolls.

3. The device claimed in claim 1 in which the member adapted to be supported on a mandrel is adapted to extend over and partly around a mandrel end, and has a positioning foot adapted in use to be rested on the flat surface area relating to the mandrel end on which said member is supported to determine the position of the member rotatively, said member also comprising means for hanging the member on the mandrel end, and marker means adapted to serve as a point of reference to facilitate bringing one roll rotatively into register with another roll.

4. In printing apparatus of the kind described comprising, backing means, a print roll having thereon a pitch mark which is a point of reference relative to the pattern engraved on the roll, a mandrel on which the print roll is keyed, aligned pairs of bearing housings defining bearings for rotatably mounting the mandrel ends, a level surface area on at least one of the bearing housings of each pair and aligned with the center of the bearing defined by the housing, and a templet adapted to be placed between one end of a print roll and the adjacent aligned mandrel bearing, having an indicator a the end thereof adjacent the print roll and means adapted to rest on the support means level surface area which is aligned with the center of said adjacent bearing and to co-act with said level surface area to determine the position of the indicator so that when the pitch mark on the print roll is in horizontal alignment with the indicator the pitch mark will lie in a plane passing through the center of said adjacent bearing and disposed radially with respect to the backing cylinder.

5. In printing apparatus of the character described comprising, a rotatable backing cylinder, a plurality of print rolls disposed on opposite sides of the axis of the backing cylinder, mandrels on which the print rolls respectively are keyed, and pairs of spaced, aligned bearing housings defining bearings for rotatably mounting the ends of the mandrels, a pitch mark on each print roll, and gauge means insertable successively between corresponding ends of the print rolls and the adjacent bearings for coacting with the pitch marks on the rolls to indicate the rotative position of the rolls in which the designs thereon will be in fit to print different parts of a composite pattern, the bearing housings for the bearings having level surfaces aligned respectively with the center of the bearings, said gauge means being adapted to be placed on a mandrel end, between a print roll end and the adjacent bearing, and comprising, an indicator, and means adapted to rest on a level surface which is aligned with the center of said adjacent bearing, and to co-act with said level surface to determine the position of the indicator so that when the pitch mark on the print roll is in horizontal alignment with said indicator the pitch mark will lie in a plane passing through the center of said adjacent bearing and disposed radially with respect to the backing cylinder.

6. In apparatus of the kind disclosed comprising, a backing cylinder, a pluraility of print rolls respectively engraved with parts of a composite design and each provided with a pitch mark related to the disposition of the design thereon, a plurality of mandrels on which the print rolls respectively are fixed, are a plurality of pairs of bearings disposed radially around a common center and each having similarly disposed external surface portions which are flat, the method of positioning the print rolls so that the parts of a composite design carried by the rolls respectively will be in fit and properly disposed with respect to each other, which comprises the steps of, providing a templet comprising a marker member on the mandrels successively, between an end of the roll carried by the mandrel and the adjacent mandrel bearing housing, controlling the rotary angle of the templet by means carried by the templet and adapted to abut against the flat external surface portion of said adjacent mandrel bearing, and rotating the print rolls individually to align their pitch marks with the said marker member.

7. In apparatus of the kind disclosed comprising, a backing cylinder, a plurality of print rolls disposed around the backing cylinder and respectively engraved with parts of a composite design and each having a pitch mark related to the disposition of the design thereon, said rolls being fixed on mandrels which are rotatably supported in bearings defined by bearing housings, each having an external surface portion aligned with the center of the bearing which it defines, the method of positioning the print rolls so that the parts of a composite design carried by the rolls respectively will be in fit and properly disposed with respect to each other, which comprises the steps of, providing a templet which is adjustable in length and carries a marker member at one end and a projecting foot at the other end, hanging the templets loosely on the mandrels successively, between an end of the roll carried by the mandrel and the adjacent mandrel bearing, and adjusting the templet to dispose its marker member close to the proximate end of the roll and to cause its foot to abut against the said external surface portion of the housing defining the adjacent mandrel bearing, and rotating each print roll and mandrel individually when the templet is applied thereto to align the print roll pitch mark with the said marker member of the templet.

8. In apparatus of the kind disclosed comprising, a backing cylinder, a plurality of print rolls disposed around the cylinder and respectively engraved with parts of a composite design and each provided with a pitch mark related to the disposition of the design thereon, said rolls being fixed on mandrels which are rotatably supported in bearings defined by bearing housings, said bearing housings being disposed at equal distances around a common center and each having a similar abutment area, the method of positioning the print rolls so that the parts of a composite design carried by the rolls respectively will be in fit and properly disposed with respect to each other, which comprises the steps of, providing a templet which carries a marker member at one end a positioning foot at the other end, hanging the templet on the mandrels successively, between an end of the roll carried by the mandrel and the adjacent mandrel bearing, disposing the templet foot relative to the templet marker member so that when the foot abuts against the housing abutment area of the adjacent bearing the marker will be 180° from the surface of the backing cylinder and disposed in a plane passing through the center of the bearing and extending radially with respect to the backing cylinder, and rotating the roll to bring its pitch mark into alignment with the templet marker.

9. In a printing machine the combination of a plurality of print rolls keyed on mandrels respectively, a gear on each mandrel, and support means for mounting the print rolls in cooperative relation for successively printing different parts of a composite pattern, means for rotating all of the print rolls including, driving means common to all the print rolls, a drive shaft for each print roll driven by the common driving means, differential gear means connected to each drive shaft, a driven shaft leading from each differential gear means, and a gear train connected to each driven shaft and including a gear meshing with the gear on the mandrel, and means for changing the rotative position of the print rolls relative to one another while they are stationary and while they are rotating comprising, a second drive shaft connected to said differential gearing, and means independent of said common driving means for driving said second drive shaft forwardly or in reverse, means for starting and stopping the common driving means, and control means for the drive means which are individual to each print roll comprising electric circuitry including circuits connected to the driving means for each of the print rolls and the means for actuating said driving means forwardly or in reverse and a common control panel having thereon switches for each of said circuits.

10. In printing apparatus in combination with a set of print rolls disposed around backing means and each engraved with part of a composite design and provided with a pitch mark indicating the begining of the part of the pattern which first comes into contact with the printing surface, opposed pairs of bearing housings in which the print rolls are journalled, the housings which are at the same end of the rolls being uniform in size and disposed at equal distances around a common center and having similarly disposed abutment areas on their external surfaces respectively, and a templet comprising, an abutment member, a pointer, and means for suspending the templet from a print roll journal without rotation with the templet, the abutment member being adapted to coact with the abutment areas on the bearing housings respectively to determine the rotary angular position of the templet relative to a journal from which it is hung.

11. In printing apparatus the combination of a backing cylinder, spaced support members between which the backing cylinder is mounted for rotation, pairs of nips projecting radially from said support members in spaced parallel relation, pairs of slides mounted on the pairs of nips respectively, pairs of bearing housings carried by said pairs of slides respectively, at least one of the housings of each pair having similarly disposed abutment areas which are disposed in alignment with the bearings defined by said housings respectively, a number of print rolls and mandrels, the print rolls being, engraved with parts of a composite pattern the position of which is indicated by pitch marks, and keyed on the mandrels respectively, and the mandrels being rotatably mounted in the pairs of bearing housings, templet means insertable between an end of a print roll and the proximate bearing housing and comprising, means for hanging the templet on the print roll mandrel without making it rotatable with the mandrel, a foot adapted to rest on the abutment area portion of the bearing housing, and a point of reference at its end which is proximate to the end of the print roll, and means for individually rotating a roll on the mandrel of which the templet has been positioned, to bring its pitch mark into alignment with the point of reference on the templet.

12. A templete comprising, a body portion defining a slideway and a slide reciprocal in said slideway, a second slideway, and a second slide reciprocal within the second slideway, a pin projecting outwardly from said second slide, the second slideway being interconnected with, and supported by, said first slide, means supported by the first slideway and adapted to loosely position the templet on a mandrel and, a positioning foot carried by and projecting from said first slideway.

13. In printing apparatus comprising, backing means, a set of print rolls each having thereon a pitch mark, mandrels on which the print rolls are respectively keyed, means for supporting the rolls around the backing means including bearing housings of equal size, disposed around a common center, in which the mandrels are rotatably supported, each bearing housing having a similarly disposed surface abutment area, the method of placing the set of print rolls in fit, ready to print successive portions of a design within the same area, which comprises, placing a templet successively between the ends of the print rolls and their supporting bearings, providing a positioning foot extending laterally from the templet at one end and establishing the rotary angle of the templet by resting its said positioning foot successively on the said similarly disposed surface abutment areas, providing a pointer arm projecting laterally from the templet adjacent its other end and radially away from the center of said backing means, with the pointer thereon directed horizontally toward the circumference of the print roll on the bearing of which the positioning foot is resting, and rotating the print roll until the pitch mark thereon is aligned with the said pointer of the templet.

14. A templet comprising, a body portion, a positioning foot depending from the body portion and adapted to rest on a support surface, means for supporting the templet loosely from a print roll mandrel without fixing the rotary angle of the body portion and pointer, a pointer arm extending laterally from the body portion, and a pointer projecting longitudinally from the pointer arm, the rotary angle of the body portion and pointer being determined by placing the positioning foot on a support surface.

References Cited by the Examiner

UNITED STATES PATENTS

| | | | |
|---|---|---|---|
| 576,276 | 2/97 | Osborne | 101—248 X |
| 896,899 | 8/08 | Dietrich | 101—178 |
| 1,083,543 | 1/14 | Kroenert et al. | 101—178 |
| 2,329,454 | 9/43 | Burroughs | 101—182 |
| 2,542,229 | 2/51 | Bojanower et al. | 101—182 |
| 2,554,345 | 5/51 | Potdevin | 101—248 |
| 2,641,181 | 6/53 | Leeberg | 33—184.5 X |
| 2,653,538 | 9/53 | Peyrebrune | 101—248 |
| 2,821,913 | 2/58 | Johnson | 101—178 |
| 2,869,459 | 1/59 | Bohme | 101—248 |
| 2,989,918 | 6/61 | Polglase | 101—248 |
| 3,026,798 | 3/62 | Frostad | 101—248 |

EUGENE R. CAPOZIO, *Primary Examiner.*

UNITED STATES PATENT OFFICE

CERTIFICATE OF CORRECTION

Patent No. 3,182,590

May 11, 1965

James Reid Johnson

It is hereby certified that error appears in the above numbered patent requiring correction and that the said Letters Patent should read as corrected below.

Column 2, line 8, for "FIG. 15" read -- FIG. 14 --; line 25, for "and" read -- are --; line 67, for "22a" read -- 20a --; column 4, line 18, strike out "cap 23 with the"; line 20, for "6" read -- 46 --; same column 4, line 50, strike out "one", first occurrence; column 5, line 3, for "ends" read -- end --; column 6, line 72, for "valves" read -- valve --; column 9, line 25, for "a" read -- at --; line 64, strike out "are", second occurrence; column 10, line 41, after "end" insert -- and --; column 11, line 6, for "begining" read -- beginning --.

Signed and sealed this 5th day of October 1965.

SEAL)

ttest:

RNEST W. SWIDER
ttesting Officer

EDWARD J. BRENNER
Commissioner of Patents